United States Patent [19]

Seigo

[11] 4,448,531
[45] May 15, 1984

[54] DISPLACEMENT MEASURING INSTRUMENT

[75] Inventor: Takahashi Seigo, Kawasaki, Japan

[73] Assignee: Mitutoyo Mfg. Co., Ltd., Tokyo, Japan

[21] Appl. No.: 308,996

[22] Filed: Oct. 6, 1981

[30] Foreign Application Priority Data

Oct. 16, 1980 [JP] Japan .................................. 55-147781

[51] Int. Cl.³ .............................................. G01B 11/02
[52] U.S. Cl. .................................. 356/374; 33/125 C; 188/188
[58] Field of Search ............... 356/373, 374; 33/125 C; 250/237 G; 188/180, 188, 378

[56] References Cited

U.S. PATENT DOCUMENTS 3,867,037 2/1975 Litke .................................. 356/373
4,215,480 8/1980 Fisher et al. ..................... 33/125 C Primary Examiner—R. A. Rosenberger
Attorney, Agent, or Firm—Koda and Androlia

[57] ABSTRACT

In a displacement measuring instrument comprising a case having a substantially enclosed construction, a fixed scale solidly secured to the case, a spindle abutted at the forward end thereof against an object under measurement and reciprocated due to a displacement of the object under measurement and a movable scale operationally associated with the spindle, and capable of measuring the displacement of the object under measurement from a variation in physical value between the movable scale and the fixed scale due to the displacement of the object under measurement, a vane wheel is provided which is rotatable by the utilization of the reciprocatory motion of the spindle or the movable scale, so that a moving resistance increasing with the increase in the rate of travel can be given against the movement of the spindle or the movable scale.

3 Claims, 4 Drawing Figures

DISPLACEMENT MEASURING INSTRUMENT

BACKGROUND OF THE INVENTION

1. Field of the Invention

This invention relates to displacement measuring instruments, and particularly to improvements in a displacement measuring instrument comprising a case having a closed construction, a fixed scale solidly secured to the case, a spindle abutted at the forward end thereof against an object under measurement and reciprocated due to a displacement of the object under measurement and a movable scale operationally associated with the spindle, and capable of measuring the displacement of the object under measurement from a variation in physical value between the movable scale and the fixed scale due to the displacement of the object under measurement.

2. Description of the Prior Art

In general, in a displacement measuring instrument for measuring a length or the like of a product, in the case of a value of movement is measured between relatively movable bodies, for example a value of movement of a measuring element with respect to its main body, or a value of movement of a slider with respect to a column, there has been known to be used a photoelectrical displacement measuring instrument in which a main scale is fixed to one body and a detector including an index scale is fixed to the other body, and a value of relative displacement between the main scale and the detector is photoelectrically read.

In the photoelectrical displacement measuring instrument of the type described, there has been normally used a photoelectrical detector as shown in FIG. 1. In the drawing, designated at reference numeral 10 is a light source, 12 and 14 a main scale and an index scale movable relative to each other, by reciprocating the main scale 12 in the direction shown by arrow A in association with the displacement of the object under measurement for example, in both of which light transmitting portions and non-light transmitting portions are formed in fringe patterns disposed at regular intervals on flat glass plates, respectively, and 16 a light receiving element for receiving a light, which has been emitted from the light source 10 and transmitted through the main scale 12 and the index scale 14. For example, the light source 10, the index scale 14 and the light receiving element 16 are fixed to the case having a substantially enclosed construction, while the main scale 12 is abutted against at the forward end thereof against the object under measurement and is reciprocated in association with the spindle reciprocated due to the displacement of the object under measurement.

In the displacement measuring instrument having such an photoelectrical detector as described above, when the main scale 12 is displaced due to the displacement of the object under measurement, a value of received light in the light receiving element 16 is valued, so that a value of the relative movement between the main scale 12 and the case can be detected, thereby enabling to obtain a characteristic feature of digitally detecting the displacement of the object under measurement. However, heretofore, the displacement measuring instrument of the type described has presented such a disadvantage that, when the rate of travel of the main scale 12 or the index scale 14 becomes high, miscounts in the movement value of the fringes often take place. For example, when the main scale 12 and the index scale 14 have a fringe width of 10 $\mu$m and a minimum reading value of 1 $\mu$m, if the rate of travel of the main scale 12 or the index scale 14 exceeds approx. 500–800 mm/sec, then errors in measurement due to miscounts have taken place.

To obviate the abovedescribed disadvantage, heretofore, a damper effect has been added to a release which had been used to operate the spindle or the rate of travel of the main scale and the index scale has been restricted by the utilization of an urging force of a spring. Particularly, in the case of utilizing the spring, even when the rate of travel of the main scale 12 or the index scale 14 is low, the spring works against the movement of the main scale 12 or the index scale 14, whereby such a disadvantage has been presented that a force required for operating the spindle and the like is increased in value even when the restriction of the rate of travel is not required.

SUMMARY OF THE INVENTION

The present invention has been developed to obviate the abovedescribed disadvantage of the prior art and has as its first object the provision of a displacement measuring instrument, in which, when the rate of travel of the spindle or the movable scale is high, the rate of travel can be decreased to a satisfactory extent, on the other hand, when the rate of travel is low, an unnecessary force can be avoided being applied.

A second object of the present invention is to provide a displacement measuring instrument wherein a vane wheel is rotatable by the utilization of reciprocatory motion of a spindle in a simplified construction.

A third object of the present invention is to provide a displacement measuring instrument having a vane wheel capable of giving a suitable value of moving resistance to the movement of a spindle or a movable scale in a simplified construction.

According to the present invention, in a displacement measuring instrument comprising a case having a closed construction, a fixed scale solidly secured to the case, a spindle abutted at the forward end thereof against an object under measurement and reciprocated due to a displacement of the object under measurement and a movable scale operationally associated with the spindle, and capable of measuring the displacement of the object under measurement from a variation in physical value between the movable scale and the fixed scale due to a displacement of the object under measurement, a vane wheel is provided which is rotatable by the utilization of the reciprocatory motion of the spindle or the movable scale, so that a moving resistance increasing with the increase in the rate of travel can be given against the movement of the spindle or the movable scale, thus enabling to achieve the first object of the present invention.

Further, according to the present invention, a rack is formed on the rear portion of the spindle, whereby the vane wheel is made rotatable through a pinion meshed with the rack, thus enabling to achieve the second object of the present invention.

Still further, according to the present invention, the vane wheel is provided thereon and four rectangular vanes arranged at regular intervals, thus enabling to achieve the third object of the present invention.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein.

DETAILED DESCRIPTION OF THE INVENTION

Figure 1:
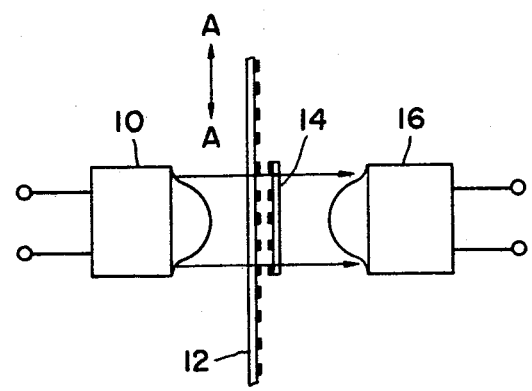
FIG. 1 is a diagram showing the principle of the photoelectrical detector used in the photoelectrical displacement measuring instrument.
Figure 3:
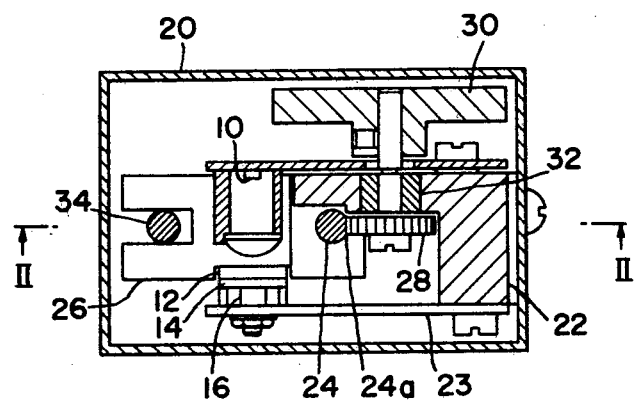
FIG. 3 is a cross-sectional view taken along the line III—III in FIG. 2.
Figure 2:
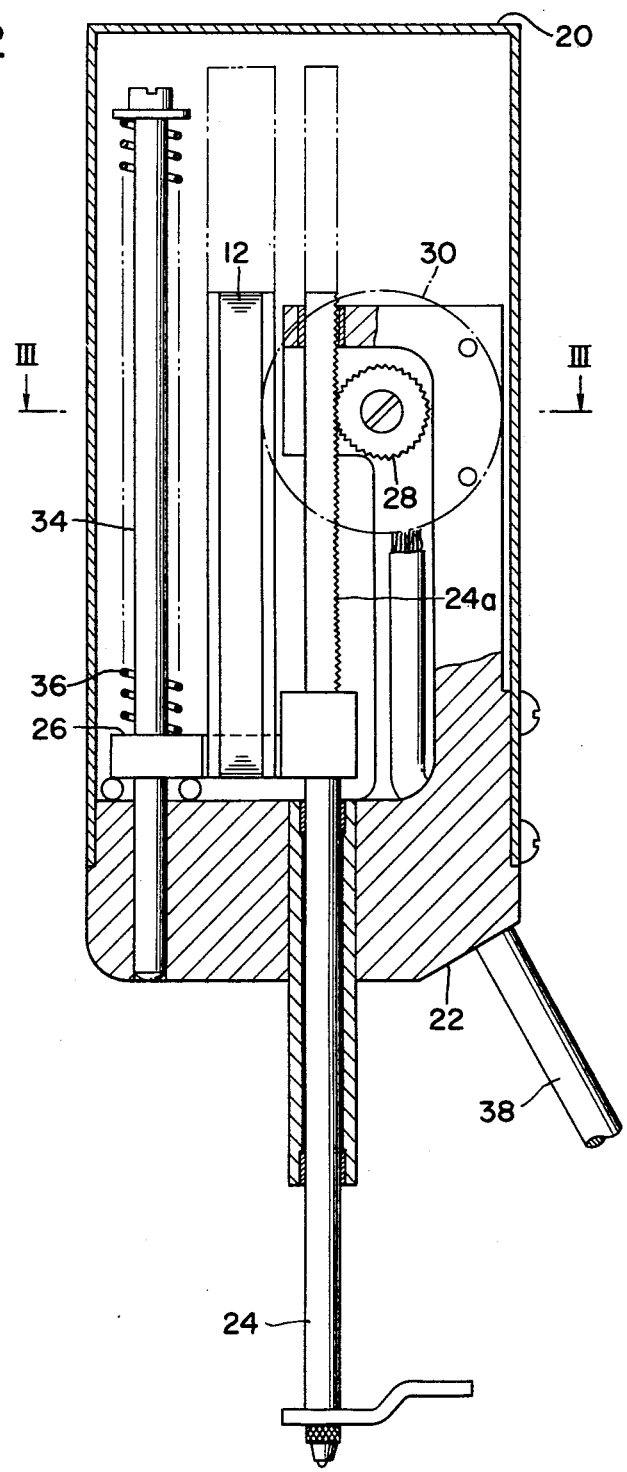
FIG. 2 is a longitudinal sectional view taken along the line II—II in FIG. 3 showing the arrangement of the embodiment of the displacement measuring instrument according to the present invention.

Detailed description will hereunder be given of an embodiment of the present invention with reference to the drawings. As shown in FIGS. 2 and 3, according to this embodiment, in a displacement measuring instrument comprising a case 20 having a closed construction, a base 22 solidly secured to the case 20, an index scale 14 being a fixed scale in this case, which is fixed to the base 22 through a stay 23, a light receiving element 16 fixed to the base 22 also through the stay 23, a spindle 24 abutted at the forward end thereof against an object under measurement, reciprocating due to the displacement of the object under measurement, and a main scale 12 being a movable scale in this case, which is solidly secured at the lower end thereof to the spindle 24 through a stay 26, and capable of measuring a displacement of the object under measurement from a variation in value of a light transmitted between the main scale 12 and the index scale 14 due to a displacement of the object under measurement, the rear portion of the spindle 24 is extended to form the rack 24a and a vane wheel 30 is rotatably supported on the base 22 through a bearing 32, which is rotated through a pinion 28 meshed with the rack 24a of the spindle 24 by the utilization of the reciprocatory motion of the spindle 24, whereby a moving resistance increasing with the increase in the rate of travel is given against the movement of the spindle 24. In the drawings, designated at 34 is a rod for locking the stay 26 against rotating, 36 a compression spring confined between the upper end of the rod 34 and the stay 26 for giving a measuring force to the spindle 24, and 38 a cord for electrically connecting a transducer-indicator, not shown, to the light source 10, the light receiving element 16 and the like disposed in the case 20.

Figure 4:
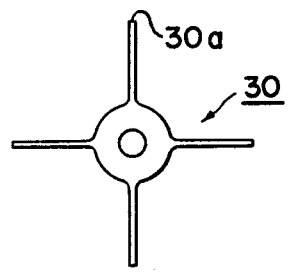
FIG. 4 is a front view showing the vane wheel used in the aforesaid embodiment.

The vane wheel 30 is provided thereon with four rectangular vanes 30a arranged at regular intervals as shown in FIG. 4 for example. Additionally, this vane 30a of the vane wheel 30 is selected in its width, length and the like in accordance with the moving resistance to be given depending on the rate of travel of the spindle 24.

Description will now be given of operation. In performing the measurement, the forward end of the spindle 24 is abutted against the object under measurement, whereby the spindle 24 is reciprocated due to a displacement of the object under measurement. Then, due to the displacement of the object under measurement, both the spindle 24 and the main scale 12 fixed at the lower end thereof to the spindle 24 are reciprocated, whereby a light transmitted between the main scale 12 and the index scale 14 is varied in value, so that the displacement of the spindle 24 is measured from a variation in value of the light received by the light receiving element 16. At this time, due to the reciprocatory motion of the spindle 24, vane wheel 30 is always rotated through the action of the pinion 28 meshed with the rack 24a of the spindle 24. When the rate of travel of the spindle 24 is low, the rotating resistance of the wind wheel 30 is as low as almost at a level of non-load, and consequently, does not adversely affect the movement of the spindle 24, so that a force for operating the spindle 24 can avoid becoming excessively high. Whereas, when the rate of travel of the spindle 24 is high, there is a possibility of occurrence of miscounts unless the rate of travel of the main scale 12 is held down. However, according to the present invention, when the rate of travel of the spindle 24 is high, the rotational speed of the vane wheel 30 is increased accordingly, whereby the rotating resistance given to the vane wheel 30 by air within the case 20 is increased. Consequently, the rate of travel of the spindle 24, i.e. the rate of travel of the main scale 12 is restricted, so that the occurrence of miscounts and the like can be avoided.

Furthermore, heat is normally generated in the case 20 incorporating therein the light source and the like, which may raise the temperature in the case 20. However, agitation of air in the case 20 by the vane wheel 30 can bring about a cooling effect.

In the abovedescribed embodiment, the vane wheel 30 is operationally associated with the spindle 24. However, the arrangement for rotating the vane wheel 30 should not necessarily be limited to this, but, needless to say, the vane wheel 30 can be directly interlocked with the main scale 12 for example.

Furthermore, in the abovedescribed embodiment, the invention has been applied to a displacement measuring instrument, in which the index scale 14 is fixed and the main scale 12 is movable, but, it is apparent that the invention may be likewise applied to a displacement measuring instrument, in which the index scale is made movable.

In the abovedescribed embodiment, the invention has been applied to a photoelectrical displacement measuring instrument, in which a displacement of the object under measurement is measured from a variation in value of the light transmitted between the main scale 12 and the index scale 14, however, it should be understood that the scope of application of the invention is not limited to this specific form, but, the invention can be likewise applied to a photoelectrical displacement measuring instrument, in which a displacement of the object under measurement can be measured from a variation in value of a light reflected between the main scale and the index scale, or other general displacement measuring instruments, wherein a displacement of the object under measurement is measured from a variation in other physical values.

What is claimed is:

1. A displacement measuring instrument comprising a case having a closed construction, a fixed scale solidly secured to said case, a spindle abutted at the forward end thereof against an object under measurement and reciprocated due to a displacement of the object under measurement, an urging means for giving a measuring force to said spindle and a movable scale operationally associated with said spindle, and capable of measuring the displacement of the objects under measurement from a variation in physical value between the movable scale and the fixed scale due to the displacement of the object under measurement, wherein a rack is formed on the rear portion on said spindle and a vane wheel is provided in said case, which is rotatable by the utilization of the reciprocatory motion of said spindle through a pinion meshed with said rack, so that a resistance to movement increasing with the increase in the rate of travel can be exerted against the movement of said spindle.

2. A displacement measuring instrument as set forth in claim 1, wherein said fixed scale is an index scale and said movable scale is a main scale.

3. A displacement measuring instrument as set forth in claim 1, wherein said vane wheel is provided thereon with four rectangular vanes arranged at regular intervals.

* * * * *